US007249572B2

(12) United States Patent
Goetzl

(10) Patent No.: US 7,249,572 B2
(45) Date of Patent: Jul. 31, 2007

(54) SEAL FOR PET COLLAR ANTENNA

(75) Inventor: Brent Andrew Goetzl, Orinda, CA (US)

(73) Assignee: Radio Systems Corporation, Knoxville, TN (US)

( * ) Notice: Subject to any disclaimer, the term of this patent is extended or adjusted under 35 U.S.C. 154(b) by 21 days.

(21) Appl. No.: 11/274,019

(22) Filed: Nov. 15, 2005

(65) Prior Publication Data

US 2007/0107671 A1    May 17, 2007

(51) Int. Cl.
*A62B 35/00* (2006.01)
(52) U.S. Cl. .................. 119/859; 119/719; 119/720; 119/765; 340/573.3
(58) Field of Classification Search ............. 119/719, 119/720, 760, 765, 859, 718, 858; 340/573.3
See application file for complete search history.

(56) References Cited

U.S. PATENT DOCUMENTS

| 5,353,744 | A | * | 10/1994 | Custer | 119/719 |
| 5,601,054 | A | * | 2/1997 | So | 119/718 |
| 6,830,012 | B1 | * | 12/2004 | Swan | 119/720 |
| 2006/0283401 | A1 | * | 12/2006 | Mainini et al. | 119/859 |

* cited by examiner

*Primary Examiner*—Peter M. Poon
*Assistant Examiner*—Willie Berry, Jr.
(74) *Attorney, Agent, or Firm*—Pitts & Brittian, PC

(57) ABSTRACT

An antenna mounting for an animal collar including an O-ring and associated retainer disposed in an opening through the housing of a radio frequency receiver. The O-ring is compressed into multiple sealing locations between the circumference of the antenna and its surrounding structure to create a resilient hermetic seal between the antenna and such surrounding structure, and to resiliently suspend the antenna within the opening in the housing.

5 Claims, 3 Drawing Sheets

SEAL FOR PET COLLAR ANTENNA

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention relates to electronic pet collars employing radio frequency signals between a remote transmitter and a receiver attached to the pet collar. In particular this invention relates to the hermetically-sealed mounting of an antenna on a receiver.

2. Description of the Related Art

Electronic pet collars are commonly used for training an animal to respond in a certain manner upon receiving a correction occurring under a single circumstance or a given set of circumstances. In one application, a correction, such as a shock stimulus, is employed in the training of hunting dogs. In this application, radio signals from a transmitter operated by a trainer are transmitted to a receiver carried on a collar which encircles the dog's neck. This receiver includes an antenna that projects from the housing of the receiver to receive the signal and transfer the same to the receiver proper where a correction is developed and transmitted to the dog's neck via dual electrodes. In a training environment, as well as when the dog is afield in an actual non-training event, there is a tendency for moisture or a liquid to pass into the interior of the receiver housing through the opening in the housing through which the antenna projects. Such moisture may be occasioned by perspiration, rain or dew-laden vegetation, for example. Such moisture or liquid can be detrimental or even destructive of the operation of the sensitive electronics of the receiver.

Generally, the prior art uses internal antennas that obviate the moisture problem. However, prior art attempts to preclude such leakage of moisture or liquid into the housing of a receiver when using external antennas have included the use of epoxy or like polymeric materials to form a hermetic seal around the antenna at the location where the antenna enters the receiver housing. Such seals are relatively unyielding when the antenna is struck as by a dog passing under a fence or through brush and therefore are subject to the development of cracks through the seal or complete failure of the seal. Moreover, commonly employed epoxies can present toxicity concerns in a manufacturing environment.

BRIEF SUMMARY OF THE INVENTION

In accordance with one aspect of the present invention there is provided a gland seal encircling a wire antenna of an animal collar having correction capability. In one embodiment, the gland seal includes an internally threaded opening extending between the interior of the receiver and the ambient environment outside the receiver.

In the present invention, one end portion of the antenna is fed through the opening through the receiver housing and into the interior of the housing leaving a major portion of the antenna extending beyond the exterior of the housing. Thereupon, an O-ring is positioned in encircling relationship to the antenna and at a location adjacent the entry to the opening through which the antenna is fed. Thereafter, a substantially rigid, flat, ring-type retainer having a central opening through its thickness and having external threads adapted to mesh with the internal threads of the opening through the housing, is fitted onto the antenna and moved into engagement with the O-ring. This retainer is provided with an annular groove in its inner wall that is adapted to engage and receive therein the O-ring. Thus, further movement of the retainer along the length of the antenna and toward the housing urges the O-ring into the opening through the housing. The retainer is thereupon threaded into the opening through the housing, carrying with it the captured O-ring. The geometrical relationship of the O-ring and the annular groove internally of the retainer are chosen to cause the retainer to compress the O-ring about the outer circumference of that portion of the antenna disposed within the opening in the housing, creating multiple hermetic seals between the O-ring and the outer circumference of the antenna, the internal wall of the annular groove of the retainer and a shoulder defined by a flange formed at the internal end of the opening through the housing. In one embodiment, the inboard end of the retainer "bottoms out" against the shoulder formed by the flange to ensure secure frictional retention of the retainer within the opening in the housing.

In one embodiment, the diameter of the opening through the receiver housing is chosen to exceed, by a small amount, the diameter of that end portion of the antenna which is disposed within the opening. As a result, when the axial dimension of the antenna is substantially aligned with the centerline of the opening through the housing, only the O-ring engages the antenna. This difference in diameters is not so great as to preclude the compression of the O-ring by the retainer into hermetic sealing relationship to the antenna, but is great enough to allow for lateral movement of the antenna without disturbance of the hermetic seal between the O-ring and the outer circumference of the antenna.

DETAILED DESCRIPTION OF THE INVENTION

Figure 1:
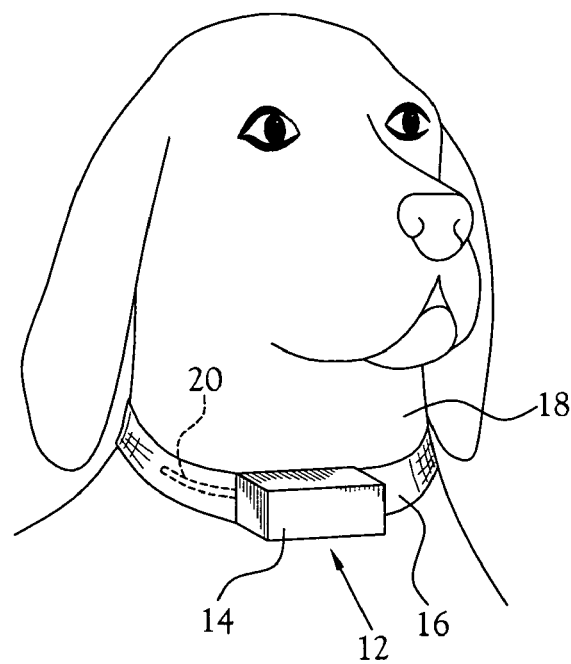
FIG. 1 is a representation of an animal wearing a collar having correction capability and an antenna according to the present invention.

With initial reference to FIG. 1, the present invention includes a radio frequency receiver 12 mounted in a hermetically-sealed housing 14 that is affixed to a collar 16 which encircles an animal's neck 18, for example.

The receiver includes a flexible antenna 20 that extends beyond the receiver and lies along and is carried by the collar 16. By routing the antenna 20 along the collar 16, the length of the antenna is extended t for ready receipt of radio frequency signals from a remote transmitter (not shown).

Figure 2:
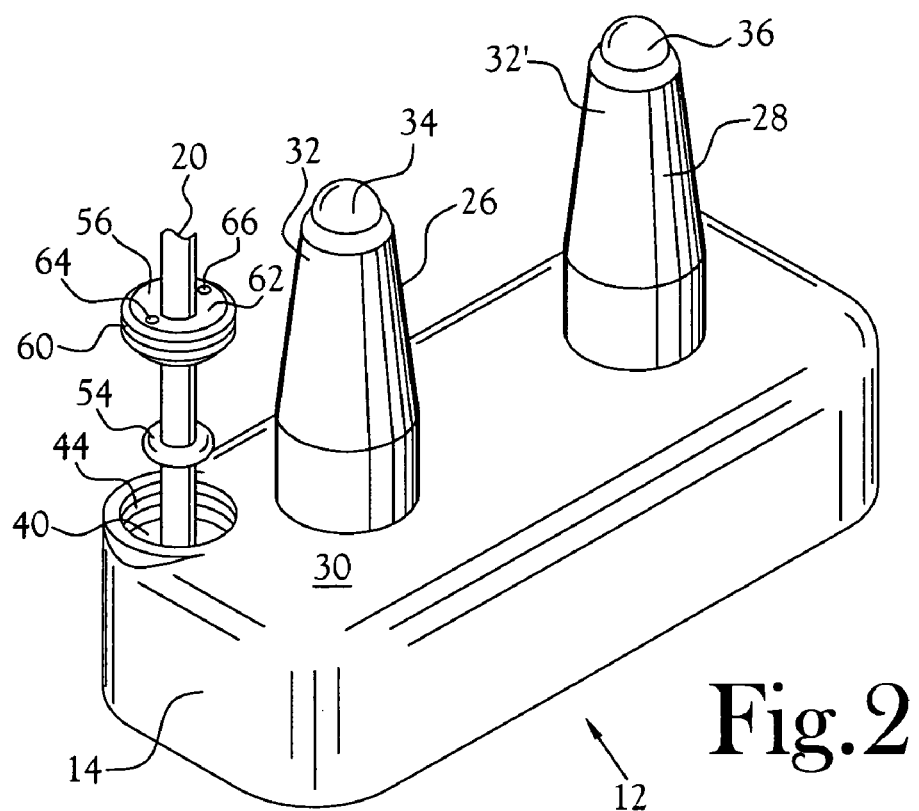
FIG. 2 is a representation, partly exploded, of a correction receiver having an antenna according to the present invention.

In the embodiment depicted in FIG. 2, the receiver includes first and second electrodes 26, 28 (typical) respectively, which project from that surface 30 of the housing 14 of the receiver at spaced apart locations and in position to physically, hence electrically, engage the pet's neck when the collar is placed about the pet's neck. Each of the electrodes is provided with an electrically-insulating outer covering 32, 32' except for their respective distal tips 34, 36. When the tips are in electrical communication with the pet's neck, a correction is transmitted to the animal. The types of corrections commonly used are known to those skilled in the art and include, but are not limited to, electroshock deterrents, animal audible deterrents, vibratory deterrents, and olfactory deterrents.

Generation of a correction by the receiver is initiated by a radio frequency signal from a transmitter located remote from the receiver 12. Receipt of the signal by the receiver is through an antenna 20. Generally, the length and configuration of the antenna are selected to provide the desired efficiency. An extended external antenna with less loading is typically more efficient and can successfully receive weaker signals allowing for increased range and greater signal-to-nose ratio (SNR). However, the use of a substantially rigid external antenna subjects the antenna to a multitude of blows or other forces which tend to bend the antenna. An external, flexible wire antenna that is routed along the collar avoids the abuse to which a rigid external antenna is normally subjected, but creates unique moisture barrier problems.

In accordance with the present invention there is provided a mounting of the antenna within the receiver housing that secures a flexible wire antenna within the housing and provides a hermetic seal 38 between the antenna and the receiver housing.

More specifically, in one embodiment of the present invention, there is provided an opening 40 in the housing 14 that leads from the interior 42 of the receiver housing to the environment ambient to the housing. This opening is provided with internal threads 44 and a flange element 46 disposed adjacent the inner end 48 of the opening and which projects radially inwardly of the opening to define an annular shoulder 50 internally of the opening and which projects into the opening. The diameter of the annular shoulder is greater than the diameter of the antenna such that the antenna will freely pass into the opening and past the shoulder to the inner electronics of the receiver contained within the housing and leave an annular void space 52 between the outer surface of the antenna and the inner surface of the shoulder. The antenna is thus free to move laterally by a limited amount within such void space.

Figure 3:
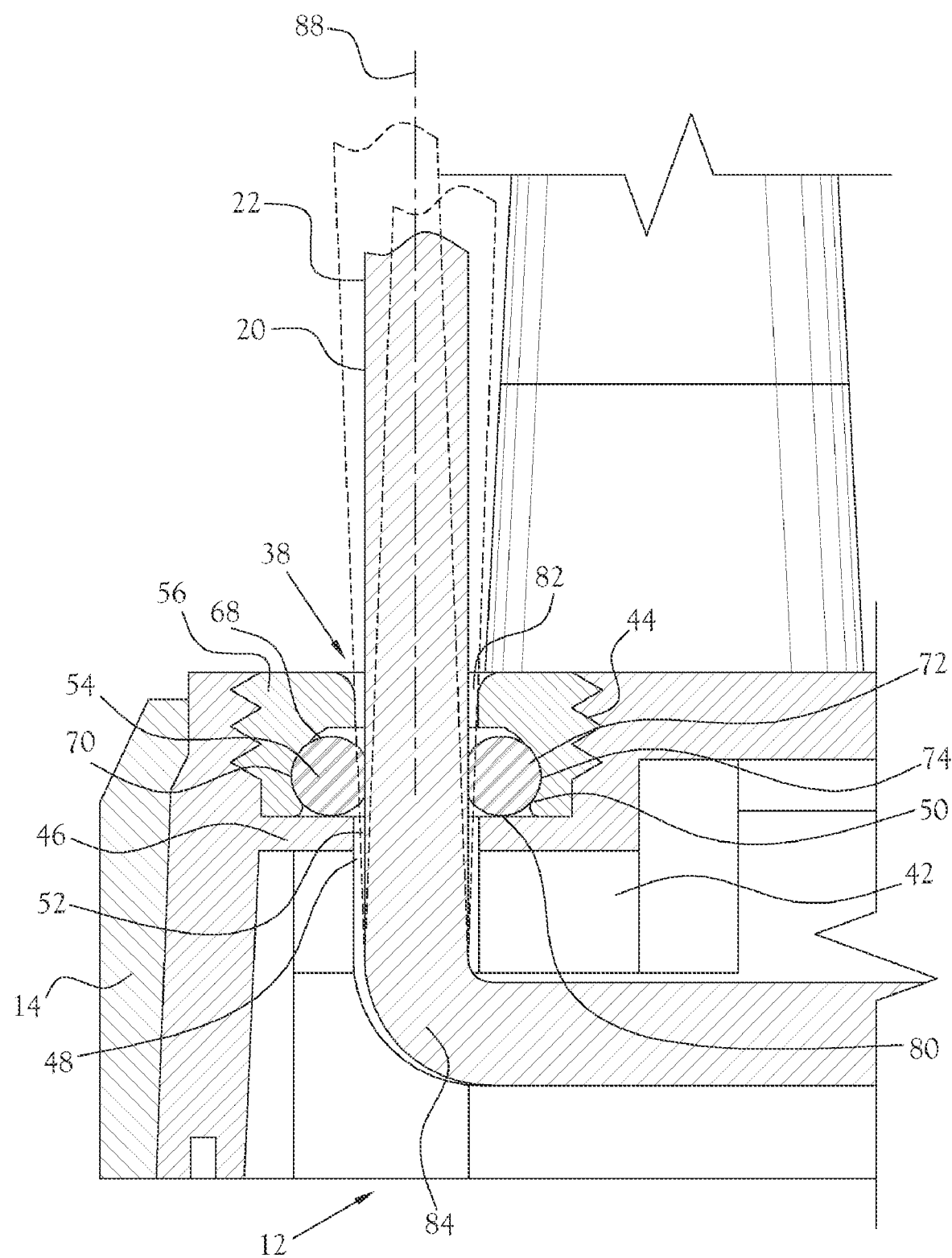
FIG. 3 is a sectional view taken generally along the line 3-3 of FIG. 2 and with the antenna assembled within the receiver; and, FIG. 4 is a perspective view of one embodiment a retainer element employed in the present invention.

As seen in FIGS. 1, 2, and 3, the antenna leads from the interior of the housing through the opening and extends beyond the housing by a predetermined length selected to provide the desired reception characteristics, e.g., to match the wavelength of the transmitted signal. The interior end of the antenna is directly connected to the electronics contained within the housing. In accordance with one aspect of the present invention, there is provided a resilient O-ring 54 in encircling relationship to the antenna. Further, there is provided a circular retainer element 56 having a central opening 58 through its thickness, in encircling and sliding relationship to the antenna and disposed distally of the O-ring along the length of the antenna. In various embodiments, the retainer element is fabricated from a metal or alloy or a substantially rigid polymeric material and in one embodiment is provided with outer threads 60 that are adapted to mesh with the inner threads 44 of the opening in the receiver housing. As needed for assembly purposes, the outer surface 62 of the retainer element is alternatively provided either with lugs that project from the outer surface or with blind bores 64, 66 in the surface, either embodiment being adapted to receive a tool (not shown) for tightening of the retainer element within the opening.

Figure 4:
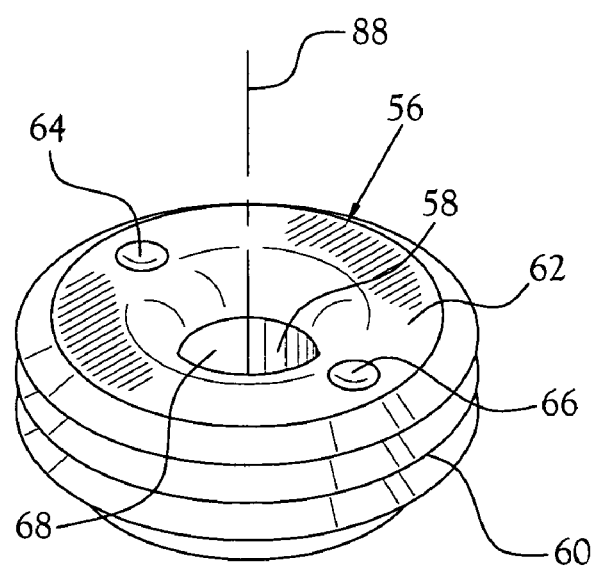

It will be noted from FIGS. 2, 3, and 4 that the retainer element is further provided with an inner annular recess 68 having a generally semi-circular cross-section, which is adapted to receive therein the O-ring in physically engaging relationship that extends about a radially-disposed portion 70 of the outer circumferential surface 72 of the O-ring (see FIG. 3). Moreover, it will be noted that the internal diameter of the retainer element is greater than the external diameter of the antenna, thereby providing for free passage of the antenna through such inner opening in the retainer and also permitting limited lateral movement of the antenna within such inner opening. More specifically, when the retainer element is threaded into the opening in the receiver housing, it carries with it the O-ring. The extent of threaded movement of the retainer element is limited by its engagement with the shoulder disposed at the inner end of the opening. As depicted in FIG. 3, which depicts a sectional view of the retainer, O-ring and housing opening, when so threaded into the opening, the retainer element compresses the O-ring to the extent that there is developed at least a first location 74 of physical and hermetically sealing engagement between the O-ring and the inner wall 76 of the retainer recess, a second location 78 of physical and hermetically sealing engagement between the O-ring and the upper surface 80 of the shoulder defined internally of the opening through the receiver housing, and a third location 82 of physical and hermetically sealing engagement between the O-ring and the outer wall of the antenna. Each such location extends fully around the outer circumference of the O-ring such that the antenna is substantially solely resiliently suspended within the opening in the receiver housing by the O-ring and biased toward alignment with the longitudinal centerline 88 of the opening through the retainer element.

By reason of the resiliency of the O-ring, which is itself impermeable to moisture or liquids, the multiple locations of engagement between the O-ring and the retainer, the shoulder of the opening in the housing and the outer diameter of the antenna, the present invention provides thorough hermetic sealing 38 between the antenna, the retainer and the housing, thereby precluding the entry of moisture or liquid into the housing from the ambient environment. Moreover, this hermetic seal is flexible, hence is neither disturbed nor destroyed when the antenna is displaced within the opening due to externally applied forces occasioned by the training exercises for the pet, for example. Within the receiver housing, the portion 70 of the antenna disposed within the housing is physically and electrically connected to the internal circuitry. In addition, the antenna is anchored by any acceptable means such as providing a sharp (e.g., 90 degree) bend 84 of the antenna and encapsulation of the antenna provided internally of the housing to provide stress/strain relief for the electrical connection. Such anchoring of the antenna within the housing is chosen to permit the desired limited lateral deflection of the antenna about the resilient O-ring.

Recalling that the diameter of the antenna is less than the internal diameter of the opening through the receiver housing, the inner diameter of the O-ring is chosen to produce a compressed frictional fit of the O-ring about the outer circumference of the antenna. Such frictional fit is enhanced by compression of the O-ring when the retainer element is threaded into the internally threaded opening through the receiver housing.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. An electronic animal training device comprising:
    a receiver housing defining an interior of said receiver,
    an internally threaded opening extending between said interior of said housing and the ambient environment,
    said opening including an inner flange extending radially inwardly of said opening and defining an annular shoulder adjacent a proximate end of said opening,
    an wire antenna having a first portion disposed within said housing and extending through said housing, and a second portion extending beyond said housing,
    a resilient O-ring which is substantially impervious to moisture and liquids, interposed in encircling and frictional engagement with said first portion of said antenna in the region of said opening in said receiver housing,
    a circular retainer element having a central opening through the thickness thereof, said retainer element being disposed in encircling, non-physically engaging relationship to said antenna,
    an annular recess of generally semi-circular cross section defined in said central opening through said retainer element and adapted to receive and frictionally engage the outer surface of said O-ring at multiple locations about the outer circumference of said O-ring,
    said retainer element having external threads adapted to mesh with said internal threads of said opening through said receiver housing whereby said retainer element with said O-ring captured within said recess is threadably insertable into said opening in said receiver housing to compress said O-ring between said retainer, said shoulder and the outer circumferential wall of said first portion of said antenna to effect a flexible hermetic seal between said antenna and said O-ring.

2. The pet collar of claim 1 wherein said antenna is resiliently suspended within said opening in said receiver housing through physical engagement with said O-ring and biased toward alignment with a centerline of said central opening of said retainer.

3. The pet collar of claim 1 wherein said retainer element abuts said shoulder when said retainer element is fully threadably inserted into said opening through said receiver housing.

4. In an animal collar having correction capability effected by means of radio frequency signals broadcast by a remote transmitter and received by a receiver mounted on an animal employing an antenna associated with said receiver and projecting from the pet beyond the profile of the pet, the improvement comprising:
    a housing associated with said receiver for isolating said receiver from ambient elemental events or circumstances;
    an opening extending through said housing;
    an antenna having a first portion disposed within said opening and to said receiver disposed within said housing, and a second portion passing through said opening and terminating beyond the exterior of said housing;
    a flexible hermetic seal defined between said antenna and said opening through said receiver housing, said seal including:
        a flexible O-ring which is impervious to moisture or liquids disposed in encircling relationship to first section of said antenna,
        a circular, generally flat, retainer element having a central opening through the thickness thereof disposed in encircling relationship to said antenna and including an annular recess adapted to receive said O-ring therein and apply compression to said O-ring upon the insertion of said retainer member into said opening through said receiver housing whereby at spaced apart locations about the outer lateral circumference of said O-ring develops separate frictional engagements with said retainer element, a shoulder and said antenna.

5. The improvement of claim 4 wherein said central opening through said retainer element is of a diameter greater than the outer diameter of said antenna and said frictional engagement of said O-ring with said antenna is the sole support for said antenna within said opening.

* * * * *